United States Patent [19]
Von Schuckmann

[11] Patent Number: 4,991,744
[45] Date of Patent: Feb. 12, 1991

[54] DISPENSER FOR THE METERED DELIVERY OF PASTY PRODUCTS

[75] Inventor: Alfred Von Schuckmann, Kevelaer, Fed. Rep. of Germany

[73] Assignee: Colgate Palmolive Company, New York, N.Y.

[21] Appl. No.: 304,553

[22] Filed: Feb. 1, 1989

[30] Foreign Application Priority Data

Feb. 4, 1988 [DE] Fed. Rep. of Germany ....... 3803229

[51] Int. Cl.$^5$ .............................................. B67D 5/42
[52] U.S. Cl. ................... 222/136; 222/207; 222/212; 222/256
[58] Field of Search ................ 222/94, 136, 145, 207, 222/212, 214, 257, 321, 380, 385, 531, 532, 536, 402.12, 386, 387, 256

[56] References Cited

U.S. PATENT DOCUMENTS

| | | | |
|---|---|---|---|
| 4,413,759 | 11/1983 | Mettenbrink | 222/213 |
| 4,474,313 | 10/1984 | Sieverding | 222/211 |
| 4,522,317 | 6/1985 | Goncalves | 222/391 |
| 4,565,306 | 1/1986 | Nakanishi et al. | 222/383 |
| 4,629,097 | 12/1986 | Moore | 222/153 |
| 4,691,847 | 9/1987 | Ford et al. | 222/400.5 |
| 4,715,518 | 12/1987 | Moore | 222/257 |
| 4,775,080 | 10/1988 | Mettenbrink | 222/341 |
| 4,776,496 | 10/1988 | Battegazzore | 222/209 |
| 4,821,926 | 4/1989 | Baltegazzore | 222/387 |
| 4,838,460 | 6/1989 | Moore et al. | 222/536 |

FOREIGN PATENT DOCUMENTS

| | | |
|---|---|---|
| 3512650 | 4/1985 | Fed. Rep. of Germany. |
| 3526819 | 2/1987 | Fed. Rep. of Germany. |
| 8809483 | 5/1988 | Fed. Rep. of Germany ...... 222/212 |

*Primary Examiner*—Michael S. Huppert
*Attorney, Agent, or Firm*—Nies, Kurz, Bergert & Tamburro

[57] ABSTRACT

A dispenser for pasty products such as toothpaste, the dispenser having a discharge nozzle and a closure member for the nozzle, the closure member and the nozzle being automatically moved away from each other during a dispensing operation and returned to closed position upon cessation of a dispensing operation. The closure member is combined with an insert for producing a striped product.

19 Claims, 3 Drawing Sheets

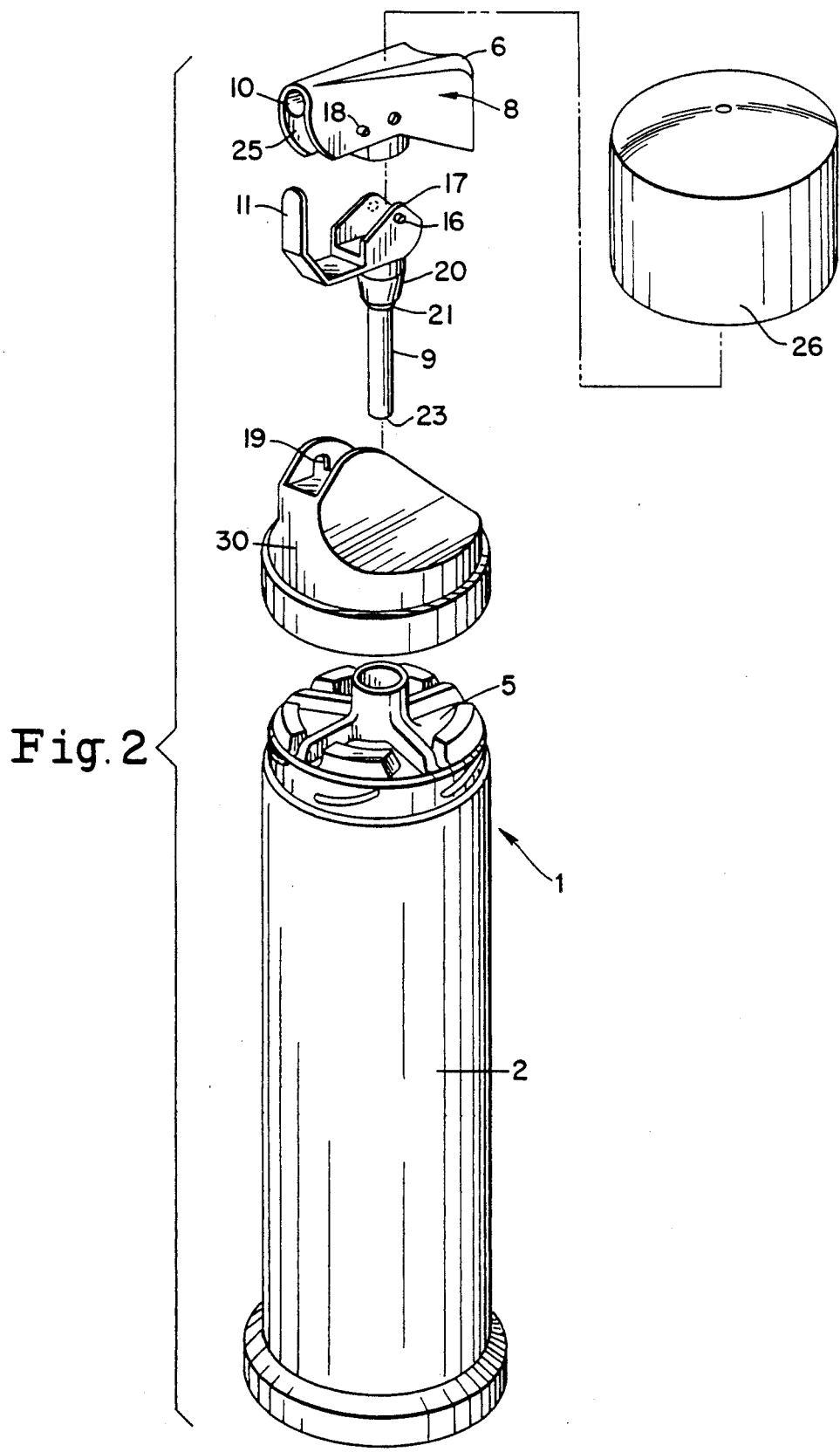

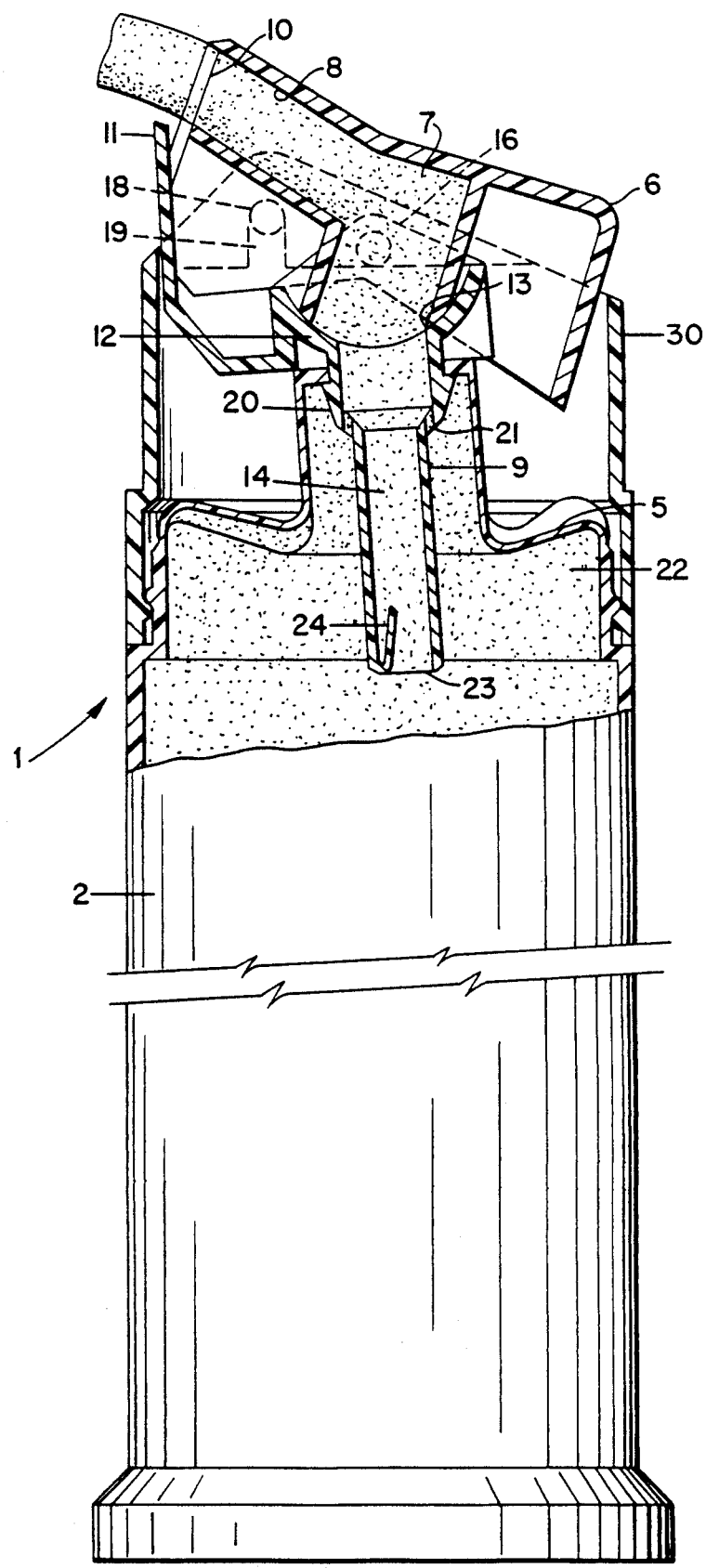

DISPENSER FOR THE METERED DELIVERY OF PASTY PRODUCTS

BACKGROUND OF THE INVENTION

Dispensers for delivery of metered quantities of pasty products have already become known in various forms. They serve in particular as dispensers for toothpaste.

With regard to the discharge tube of a dispenser of this type it is known that the same may be closed by means of a separate stopper or also automatically in the course of its dispensing operation. Known in this context, for example from U.S. Pat. No. 3,217,933, is the opening of the cross-sectional area of the discharge tube via the displacement, by pressing down a handle, of a closing slide positioned directly in front of the discharge opening, which slide, being spring loaded, automatically returns to its closing position in the discharge tube on release of the handle. Further known, from U.S. Pat. No. 3,268,123, is the provision, in the case of a dispenser equipped with a follower piston, or a closure means within the tube, which moves inwardly to open position in operation.

It is known from German Pat. No. 3,104,726 that a closure cap can be molded as one piece with the activating handle or button. The rocking movement of this handle swings the closure cap upward and away from the nozzle opening of the stationary discharge tube. A similar principle is also embodied in U.S. Pat. No. 4,691,847.

SUMMARY OF THE INVENTION

The invention addresses itself to the development of a more user-friendly configuration for a generic dispenser, especially for one like that known from German Pat. No. 3,104,726.

This invention provides a dispenser in which the nozzle opening of the discharge tube is closed automatically and where the segment of the discharge tube having the nozzle opening, can be rocked upward into an open position by means of an operating handle or button, in which case the closure member for the nozzle opening moves downward away from the nozzle opening. Such an arrangement offers many advantages. In the case of the typical manipulation of such a dispenser, for example, the application of toothpaste to a toothbrush, it is possible to bring the nozzle opening of the discharge tube directly to the toothbrush without hindrance. During the automatic closure of the nozzle opening by the closure portion of the closure member, the nozzle opening of the discharge tube is rocked downwardly toward said closure member. The very small quantities of pasty product which may extend from the discharge nozzle will be stripped off from below by the closure member and can then be easily applied more or less as a leftover, to a toothbrush. When not in operation the discharge tube is swung into a position of concealment.

Many advantageous possibilities result with regard to the configuration and anchoring of the closure member since the latter can be attached beneath the discharge tube.

As an advantageous further developement of the subject matter of the invention it is possible to form the discharge tube as two separate parts which may be termed a rocker segment and a diaphragm segment. It is here preferable to have the rocker segment of the discharge tube coordinate in the manner of a ball-and-socket joint with a diaphragm segment of the discharge tube, which extends more or less through a pump diaphragm of the dispenser. The designation "diaphragm segment" does not limit such an arrangement to a dispenser with a pump diaphragm. It can also be a dispenser with a pump piston. In either case there is a further segment of the discharge tube relative to which it is possible to rotate the rocker segment. Due to the coordination of the parts, resembling that of a ball-and-socket joint, it is possible to effect a tilting movement so that the nozzle opening traces a circular path in operation. The ball-and-socket joint provides good sealing action with the simultaneous possibility of tilting the rocker segment and the diaphragm segment with respect to one another.

It is preferable to provide the rocker segment with a larger cross section, at least in the region of the ball-and-socket joint, than that of the coordinated diaphragm segment. It is moreover advantageous that the central axis of the rocker segment be displaced from that of the diaphragm segment. A tilting of these parts relative to one another will thereby leave the cross-sectional area of the bore in the diaphragm segment undisturbed. A particular advantage of the ball-and-socket joint or at least similarly operating coordination of the rocker segment and diaphragm segment results from the curved transitional area in the vicinity of the joint, which is particularly significant in the case of a two-color-dispenser. The closure part of the closure member, which coordinates with the opening in the discharge nozzle, can of course be mounted upon the dispenser housing or barrel as a stationary element. Per a further aspect of the invention provision is made that the closure part coordinating with the nozzle vent be an integral part of the diaphragm segment of the discharge tube. From the viewpoint of manufacture it is possible to mold the diaphragm segment together with the closure member as a single piece. This provides an additional benefit if the diaphragm segment of the discharge tube is movable, that is to say, downwardly displaceable, when dispensing the product. During the operation of the dispenser the rocker segment with the outlet nozzle tilts upward whereas at the same time the closure member and diaphragm segment swing in a downward direction. This produces a very rapid opening of the discharge tube as well as, conversely, rapid closing, particularly due to the points of articulation described below.

According to a further aspect of the invention the diaphragm segment is accommodated on the rocker segment or on the opening handle or button, whereas the rocker segment is rotatably mounted upon the dispenser housing or barrel. The diaphragm segment can be linearly movable. Furthermore, it is also possible to arrange the diaphragm segment so that it will swing through a certain arc. Since the rocker segment of the discharge tube forms part of the trigger or button mechanism, an activation of the dispenser effects a preliminary tilting of the rocker segment and at the same time, via the mounting of the diaphragm segment upon the rocker segment of the discharge tube a downward displacement of the diaphragm segment, that is to say, makes a pumping movement.

It is preferred that the mounting of the rocker segment of the discharge tube be laterally displaced with reference to the central axis of the diaphragm segment of the discharge tube at the dispenser head. In cross section the mounting of the rocker segment is eccentrically positioned with reference to the bearing-coupling site of the diaphragm segment, in the direction of the nozzle outlet. The mounting of the rocker segment can be formed by an upwardly closed oblong hole molded into the dispenser housing or barrel. The oblong hole offers advantages during assembly by making it possible to snap parts into position from below.

Particular importance is also given in the invention to the configuration of the dispenser for the formation of stripes. The discharge tube has for this purpose, in a tapering portion of its diaphragm segment, holes to permit the passage of a product mass having a second color, which is housed in an annular space between the diaphragm or barrel wall of the dispenser and the inlet portion of the diaphragm segment of the discharge tube. Provision is also made in this design for a check valve to be positioned near the inlet opening of the diaphragm segment, inside the latter, so that the second product mass will be able to flow through the discharge tube freely, without the interposition of a valve, whereas the first and principal product mass flows through a valve during a pumping cycle.

BRIEF DESCRIPTION OF THE DRAWINGS

FIG. 2 is an exploded view of the dispenser; and

FIG. 3 shows the dispenser of FIG. 1, with the button depressed in dispensing position.

DETAILED DESCRIPTION

Figure 1:
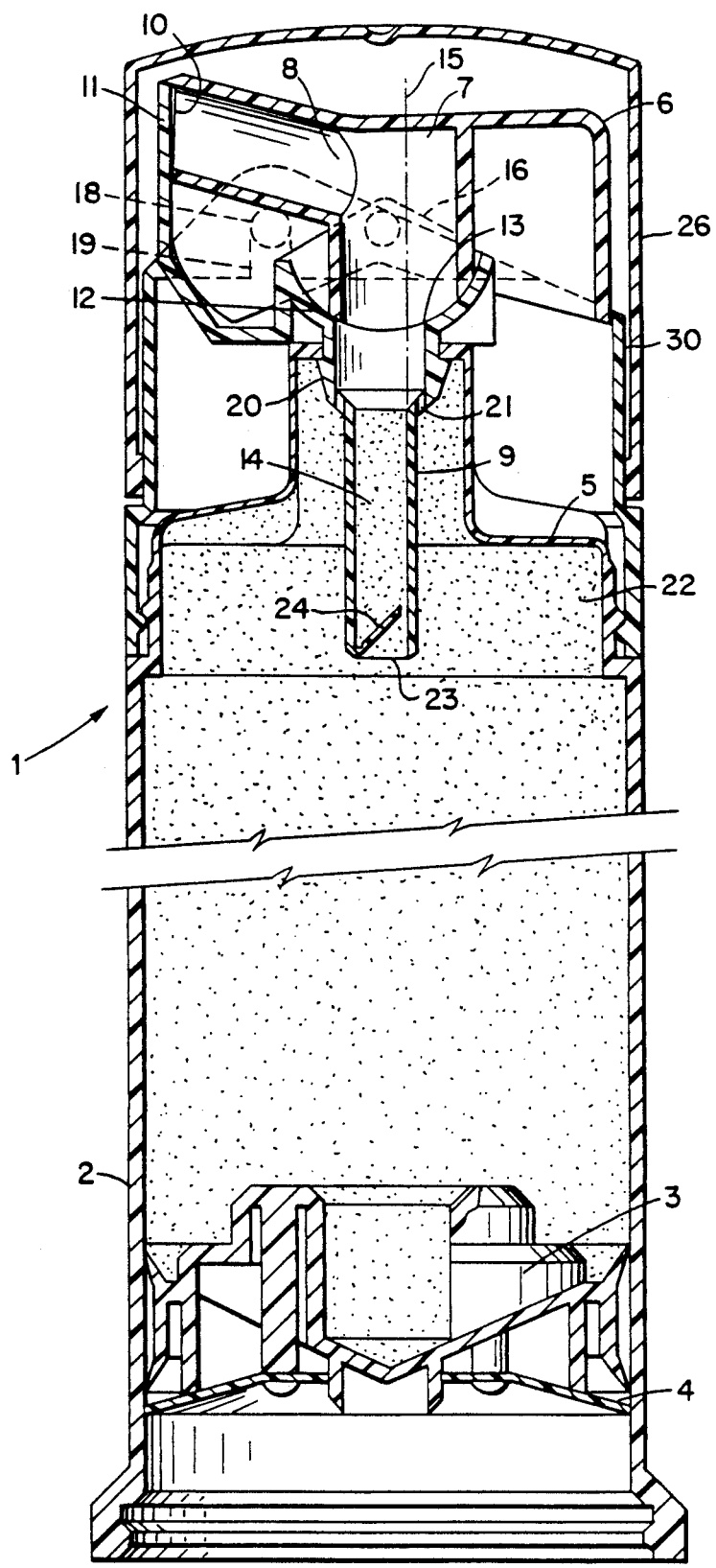
FIG. 1 is a lengthwise cross section through the dispenser.

Illustrated and described is a dispenser 1 for the metered delivery of a pasty product such as toothpaste. The dispenser 1 includes and essentially cylindrical dispenser housing or barrel 2 containing a piston 3, which can be be moved only in the direction of discharge due to the action of an annular spring 4. Formed in the upper end of the dispenser 1 is a pump diaphragm 5 with a terraced surface, as described in detail in applicant's copending application Ser. No. 07/195,249 filed May 18, 1988. Reference is here made to the entirety of that application. The space between the diaphragm 5 and the piston 3 is normally filled with a pasty substance such as toothpaste.

The dispenser 1 includes an activating trigger or button 6 in which a portion of the discharge tube 7 is formed, namely the rocker segment 8. The discharge tube 7 continues downward into a diaphragm segment 9 which snaps into the diaphragm 5. The rocker segment 8 of the discharge tube 7, which includes the nozzle outlet 10, can be tilted upward into an open position, relative to a closure part 11 molded integrally with the diaphragm segment 9 by pressing down the button 6 (see also FIG. 3).

The rocker segment 8 of the discharge tube 7 operates in coordination with the diaphragm segment 9 of the discharge tube 7 via a spherical cavity 12 like a ball-and-socket joint. For this purpose the diaphragm segment 9 is bowl-shaped in the region of interface, whereas the rocker segment 8 has a mating arcuate lower edge 13 in this same region. Specifically, the arrangement also provides that the central axis 14 of the diaphragm segment not coincide with the central axis 15 of the rocker segment (in the rest position). Furthermore, the rocker segment 8 has a larger diameter than the diaphragm segment 9, in the region of the ball-and-socket joint. When segment 8 and segment 9 are tilted relative to one another, as shown for example in FIG. 3, it is possible for the strand of pasty product passing through the diaphragm segment to enter the rocker segment at all times without hindrance. The closure part 11, which has the overall form of a slide, is molded in one piece with the diaphragm segment 9 of the discharge tube 8.

Of particualr significance is the mounting of the combined button 6 and rocker segment 8 and the mounting of the diaphragm segment 9. The rocker segment 8 rotatably mounted via a pivot pin or trunnion 18 in an oblong hole 19 in the dispenser housing or barrel 2 or, more specifically, in the dispenser head 30. The diaphragm segment 9 is connected via pivot lugs 16 and the coordinated bearing cavities or holes in the button 6 are positioned more or less in the region of the central axis 14 of the diaphragm segment 9. The pivot lugs 16, which rotatably connect the diaphragm segment 9 to the button unit 6, absorbs the forces developed by actuation of the button 6. The ball-and-socket joint is thus relieved of any bearing forces. It has to assume merely the function of sealing.

When the button 6 is depressed to dispense the product the diaphragm segment 9 performs a tilting movement—even if only a relatively small one—and at the same time downward displacement. Both motions move the closure part 11 away from the nozzle opening. The result is a rapid opening and closing of the nozzle.

The diaphragm segment 9 has, beneath the ball-and-socket joint, a tapered segment 20 having openings 21 for the passage of a mass of pasty product 22 of a different color from that of the primary mass. The colored mass 22 fills the space within the diaphragm 5 above the lower end of the tube 9. The pasty mass 22 of a second color is able to flow unhindered through the holes 21 to the nozzle outlet 10.

Positioned near the entrance 23 of the diaphragm segment 9 of the discharge tube 7 is a check valve 24 which prevents reverse flow of product during the recovery movement of the pump diaphragm 5 to thereby assure the following movement of the piston 3 under atmospheric pressure. The reliable operation of the dispenser 1 is thereby assured, without hindering stripe formation through the use of a valve.

As is particularly evident in FIG. 2, a trailing surface 25 is provided beneath the nozzle outlet 10 of the rocker segment 8 within the button 6. Any pasty product still present near the nozzle outlet 10 following an operating cycle is engaged by the closure part 11 during the downward movement of the outlet 10 of the nozzle and pushed upward and in part inward. Any resulting residues then tend to cling to the upper edge of the closure piece 11 and can be easily scraped off.

The dispenser 1 can be covered with a cap 26 for shipping and the like.

I claim:

1. Dispenser for the metered delivery of a pasty substance comprising a housing defining a chamber for containing said substance and having a discharge end, piston means mounted within said housing and being incrementally displaceable in the direction of said discharge end, pump means mounted within said housing between said discharge end and said piston means, said pump means being resiliently biased to a non-dispensing position and actuatable toward said piston means to pump said substance from said chamber toward said discharge end, a discharge tube assembly including a first segment associated with said pump means and having a first passageway communicating with said chamber, a second rocker segment pivotally connected to said housing, said rocker segment having a discharge opening and a second passageway communicating between said discharge opening and said first passageway, said rocker segment being pivotable between a first normally closed position and a second open dispensing position, closure means mounted adjacent said rocker segment for closing said discharge opening when said rocker segment is in said first position, said rocker segment being pivotally actuatable to its second position to move said discharge opening away from said closure means and to actuate said pump means to pump said substance from said chamber through said first and second passageways out through said discharge opening, whereby upon its release said rocker segment automatically returns to said first position and said closure means automatically closes said discharge opening.

2. Dispenser according to claim 1, characterized by the fact that the rocker segment is mounted in an at least upwardly closed, elongated hole, formed in the dispenser housing.

3. Dispenser according to claim 1, in which the first segment has in its upper region passages for a pasty substance having a second color, characterized th the fact that a check valve is positioned near the inlet opening of the first passageway, and by the fact that the pasty substance having a second color is able to flow through the upper region passages freely, without the interpositon of a valve.

4. Dispenser according to claim 1, characterized by the fact that the first segment has the form of an insert snapped into the roof of a diaphragm.

5. A dispenser as defined in claim 1. said rocker segment and said first segment having cooperating mating arcuate surfaces which provide a seal around the juncture of said first and second passageways as said rocker segment is pivoted with respect to said first segment.

6. A dispenser as defined in claim 5, wherein in the region of said seal juncture said second passageway is larger in size than said first passageway so that as said rocker segment is pivoted said substance may pass from said first passageway to said second passageway without hindrance.

7. A dispenser as defined in claim 6, wherein in the region of said seal juncture the axis of said second passageway is offset from the axis of said first passageway when said rocker segment is in said first closed position.

8. A dispenser as defined in claim 5, comprising means connecting said rocker segment to said first segment so that said first segment is moved with said rocker segment without imposing any force on said mating surfaces.

9. A dispenser as defined in claim 1, said mating arcuate surfaces forming a ball-and-socket joint.

10. A dispenser as defined in claim 1, said closure means being movable in a direction with said pump means when said rocker segment is pivoted to its dispensing position.

11. A dispenser as defined in claim 10, said closure means being connected to said first segment and movable therewith as said rocker segment is pivoted.

12. A dispenser as defined in claim 11, said closure means being molded integrally with said first segment.

13. Dispenser for the metered delivery of a pasty substance comprising a housing defining a chamber for containing said substance and having a discharge end, piston means mounted within said housing and being incrementally displaceable in the direction of said discharge end, pump means mounted within said housing between said discharge end and said piston means, said pump means being resiliently beased to a non-dispensing position and actuatable toward said piston means to pump said substance from said chamber toward said discharge end, a discharge tube assembly including a first segment mounted on said pump means and having a first passageway communicating with said chamber, a second rocker segment pivotally connected to said housing, said rocker segment having a discharge opening and a second passageway communicating between said discharge opening and said first passageway, said rocker segment being pivotable between a first nondispensing position and a second dispensing position, closure means mounted adjacent said rocker segment for closing said discharge opening when said rocker segment is in said first position, said rocker segment being pivotally actuatable to its second position to actuate said first segment and said pump means to pump said substance from said chamber through said first and second passageways out through said discharge opening whereby upon its release said rocker segment automatically pivotally returns to said first non-dispensing position.

14. A dispenser as defined in claim 13, said mating arcuate surfaces forming a ball-and-socket joint.

15. A dispenser as defined in claim 13, wherein in the region of said seal juncture said second passageway is larger in size than said first passageway so that as said rocker segment is pivoted said substance may pass from said first passageway to said second passageway without hindrance.

16. A dispenser as defined in claim 15, wherein in the region of said seal juncture the axis of said second passageway is offset from the axis of said first passageway when said rocker segment is in said first closed position.

17. A dispenser as defined in claim 13, comprising closure means connected to said first segment and mounted adjacent said rocker segment for automatically closing said discharge opening when said rocker segment is released and returns to said first non-dispensing position.

18. A dispenser as defined in claim 17, said closure means being movable in a direction with said first segment and said pump means when said rocker segment is pivoted to its dispensing position.

19. A dispenser as defined in claim 18, said closure means being molded integrally with said first segment.

* * * * *